3,201,292
PROCESS FOR PRODUCING WELDING POWDERS
Gustav Miltschitzky and Walter Schindelin, Burghausen, Upper Bavaria, Germany, assignors to Wacker-Chemie G.m.b.H., Munich, Bavaria, Germany, a corporation of Germany
No Drawing. Filed Mar. 20, 1962, Ser. No. 181,154
Claims priority, application Germany, Mar. 30, 1961, W 29,736/61; Jan. 23, 1962, W 31,526/62
13 Claims. (Cl. 148—26)

This invention relates to the manufacture of welding powders and it has for its object to provide a novel and improved process for this purpose.

Another object of the invention is to provide composite welding powders which contain the essential ingredients of known basic welding powders but have lighter powder densities than said known powders and insure more effective welds than heretofore.

Still another object is to provide composite welding powders in which the individual particles or granules are composed of a core of foamed basic welding substances enveloped in a coating which contains oxidizing and/or deoxidizing agents and materially increases the effectiveness of the weld.

Various other objects and advantages will become apparent as the nature of the invention is more fully disclosed.

Loose free-flowing welding powders with the customary powder densities (kg./liter) are partly melted during welding by the arc. The slag settles on the fluid material and thus it forms the welding seam. During the welding process masses of welding powder are introduced into the liquid slage bath by their own weight and thereby they cool the bath. In this way the slag bath remains toughly viscous and prevents the rapid escape of the gases forming during the welding process, which causes strong pore formation. This is particularly the case when, during the processing of rusting sheet iron, gases are formed from the iron oxide and the moisture which is present.

Attempts have been made to eliminate the above defects by using welding powders with light powder densities. These float on the liquid slag, and, since their own weight is small, they cannot penetrate into the slag bath so much and they cool it very little. Due to the higher heating a thinly liquid slag layer is formed which passes gases easily. This reduces the multitude of pores in the seam which is formed.

Furthermore, due to the small powder density the welding seams which are formed show a smoother, more flatly arched and wider surface than the welding seams made with welding powders of customary powder densities.

Since it is not possible to have all melting substances foam well, particularly the basic ones employed in welding powders and those containing many heavy metal oxides, it has heretofore been impossible to make welding powders of the kind mentioned with lower powder densities. This deficiency has now been overcome by our present invention according to which acid or neutral basic substances which have been foamed and granulated by any suitable method are covered or enveloped by a coating of basic components and/or components containing oxidizing and/or deoxidizing agents.

For acid or neutral basic substances, preferably fused masses are used which contain 30–55% $SiO_2$, 1–15% $Al_2O_3$, 0–15% $TiO_2$, 1–35% CaO, 0.5–25% MgO, 0–10% $CaF_2$, 0–10% MnO, 0–2% $Fe_2O_3$, all percentages being by weight.

As additives we can, for instance, use metals which combine with nitrogen and thus increase the impact resistance or toughness, such as vanadium, niobium, tantalum. Boron, which has hardening properties, can also be added. By the addition of tungsten the metal itself can be hardened, while by the addition of chromium or molybdenum the weld can be made tough-hard. The addition of zirconium and titanium imparts a fine-grained texture. Generally all additives can be used that improve the welding seam or which bring it into conformity with the composition of the base material.

The enveloping or covering substances which lend the basic properties to the welding powder are the same as those that usually give welding powders their basic character. These are for instance oxides, carbonates, aluminates, titanates or basic silicates of the metals of the 1st and 2nd main groups of the Periodic System or of the rare earths singly or in mixtures, in suitable cases adding fluorspar or cryolite.

If the welding powder is to be useful for rapid welding processes, it is advantageous that it have a mild oxidizing effect. For this purpose one uses enveloping components containing oxidizing agents in fine form, for instance oxides of manganese or of iron.

In order to prevent the burning out of alloy components of the basic working material and the introduction of oxides, deoxidizing agents are added to the enveloping mass, as for instance ferro-silicon, calcium-silicon, aluminum-calcium-silicon, aluminum-silicon, magnesium-calcium-silicon, manganese silicide, chromium silicide.

However, it is also possible to combine the envelopers in such a way that welding powders are obtained which for instance have a basic and oxidizing or a basic and deoxidizing effect.

Furthermore, materials can be added to the enveloping mass that improve the welding seam and are not contained in the foamed base substance. For this purpose metals, metal alloys, metal oxides of the 4–8 side groups of the Periodic System may usually be employed singly or in mixtures. Thereby it is possible also to bind the nitrogen for instance and to increase the notched-bar toughness or to change the hardening properties or to make the texture fine-grained.

To make the welding powders one mixes for example the foamed and granulated base substance with the finely ground enveloper mass in any suitable mixing device, for instance in a mixing drum, and thereafter the mixture is heated until slightly softened. The enveloper substance which did not adhere is separated from the welding powder by means of any suitable sifting device.

However, it is also possible to place a thin layer of an adhesive substance upon the foamed and granulated base substance, for instance a solution of soda or silicate of soda. The base substance, thus treated, is mixed with the finely ground enveloper mass, for instance in mixing drums by which a uniform envelope is achieved. Subsequently the mixture is dried at a temperature of 500–600° C.

According to the process of our invention it is possible either by adhering to certain sinter temperatures, or by maintaining longer or shorter sintering periods, or by varying the quantity of the adhesive substance, to influence the percentage of the component to be introduced.

EXAMPLE 1

Base materials with the compositions shown in Table I are melted in the electric furnace and foamed by pouring the melt into water.

Table I

| Ingred. | Base Materials | | | | | |
|---|---|---|---|---|---|---|
| | 1 | 2 | 3 | 4 | 5 | 6 |
| $SiO_2$ | 53.15 | 41.32 | 37.00 | 40.55 | 36.80 | 38.27 |
| $Fe_2O_3$ | 0.18 | 0.48 | 0.81 | 0.68 | 1.10 | 0.15 |
| $Al_2O_3$ | 4.10 | 13.91 | 14.74 | 13.50 | 10.27 | 12.12 |
| $TiO_2$ | | | 0.74 | | | |
| MnO | | | 7.66 | | 7.55 | 6.99 |
| CaO | 28.87 | 28.48 | 21.80 | 27.52 | 16.33 | 19.01 |
| MgO | 9.54 | 10.48 | 11.35 | 8.15 | 10.17 | 11.20 |
| $CaF_2$ | 4.16 | 5.33 | 5.90 | 6.10 | 7.46 | 8.96 |
| $V_2O_5$ | | | | | | 0.80 |
| FeCr | | | | 3.50 | | |
| FeTi | | | | | | |
| Fe | | | | | 10.32 | 2.50 |
| Powder density | 0.542 | 0.788 | 0.798 | 0.822 | 0.991 | 0.875 |

After drying, the pieces of foam are cut up into small pieces on a roller and by sifting a granulation of 0.3–1.5 mm. is obtained. The granules which are too big are cut up once more and sifted, and the particles that are too small are fed back to the furnace.

The materials enumerated in Table II are used for enveloping substances in connection with Example 1.

furnace to about 900° C. for one hour. After cooling the enveloping substance which has not been sintered is separated from the finished welding powder by screening.

Table III

[Welding powder combination according to Example 1]

| Base mat. No. | Powder Density | Percent. | Envelop. mat. | | Powder Density of Weld. Powder |
|---|---|---|---|---|---|
| | | | No. | Percent. | |
| 1 | 0.542 | 75.25 | a | 24.75 | 0.703 |
| 1 | 0.542 | 71.50 | c | 28.50 | 0.788 |
| 3 | 0.798 | 86.50 | a | 13.50 | 0.747 |
| 3 | 0.798 | 84.40 | b | 15.60 | 0.780 |
| 3 | 0.798 | 88.70 | c | 11.30 | 0.902 |
| 2 | 0.788 | 77.40 | e | 22.60 | 0.798 |
| 3 | 0.798 | 83.30 | d | 16.70 | 0.922 |
| 3 | 0.798 | 68.24 | g | 31.76 | 0.977 |
| 2 | 0.788 | 80.36 | f | 19.64 | 0.852 |
| 2 | 0.788 | 78.74 | h | 21.26 | 0.831 |
| 2 | 0.788 | 72.00 | k | 28.00 | 0.952 |
| 3 | 0.798 | 81.65 | i | 18.35 | 0.968 |
| 4 | 0.822 | 75.30 | e | 24.70 | 0.833 |
| 5 | 0.991 | 81.05 | c | 18.95 | 0.973 |
| 6 | 0.875 | 78.21 | e | 21.79 | 0.882 |
| 4 | 0.822 | 72.42 | d | 27.58 | 0.836 |
| 3 | 0.798 | 76.12 | l | 23.88 | 0.825 |

Table II

| Ingred. | Enveloping Materials | | | | | | | | | | |
|---|---|---|---|---|---|---|---|---|---|---|---|
| | a | b | c | d | e | f | g | h | i | k | l |
| $SiO_2$ | 0.41 | 0.41 | 0.16 | 0.72 | 2.56 | 0.40 | 4.18 | 0.38 | 0.15 | 0.19 | 0.41 |
| $Fe_2O_3$ | 0.62 | 0.41 | 1.49 | 1.41 | 0.80 | 0.64 | 1.42 | 0.62 | 1.50 | 1.78 | 0.62 |
| $Al_2O_3$ | 29.60 | 30.79 | 21.69 | 18.94 | 23.41 | 29.87 | 8.63 | 29.03 | 21.02 | 26.02 | 24.60 |
| $TiO_2$ | 0.38 | | 12.36 | 10.65 | 13.06 | 0.37 | 4.24 | 0.55 | 12.03 | 14.83 | 0.38 |
| MnO | 0.08 | 4.12 | 4.15 | 15.66 | 14.65 | | 42.09 | | 4.00 | 4.98 | 0.08 |
| $MnO_2$ | | | | | | | 4.08 | | | | |
| $Cr_2O_3$ | | | | | | 2.89 | | 2.50 | | | |
| NiO | | | | | | 5.61 | | 3.12 | | 6.68 | |
| $V_2O_5$ | 0.70 | 0.38 | | | | 0.81 | | 0.82 | | | 0.70 |
| $MoO_3$ | | | | | | | | | | | |
| CaO | 27.02 | 27.03 | 25.62 | 22.68 | 23.14 | 27.27 | 11.00 | 28.35 | 25.20 | 30.73 | 22.02 |
| MgO | 7.84 | 3.55 | 0.40 | 0.35 | 0.62 | 7.90 | 0.14 | 7.80 | 0.38 | 0.48 | 7.84 |
| BaO | | | 0.80 | 0.09 | | | 1.37 | | 0.60 | 0.96 | |
| $Na_2O$ | | | | | | | | | | | |
| $K_2O$ | | | | | | | 1.80 | | 1.60 | | |
| $CaF_2$ | 33.35 | 33.31 | 33.33 | 28.90 | 21.76 | 22.44 | 22.85 | 21.03 | 30.12 | 13.35 | 33.35 |
| FeSi | | | | | | | | 4.20 | | | |
| FeMo | | | | | | | | | 5.00 | | |
| Fe | | | | | | | | | | | 10.00 |

The base materials shown in Table I are mixed in a mixing drum with the enveloping materials shown in Table II and thereafter the mixture is heated in a muffle

EXAMPLE 2

The base materials listed in Example 1, and the enveloping materials of the following Table IV, are used.

Table IV

| Ingred. | a | b | c | d | e | f | g | h | i |
|---|---|---|---|---|---|---|---|---|---|
| $SiO_2$ | 2.25 | 1.16 | 3.75 | 2.07 | 0.19 | 0.18 | 2.05 | 0.33 | 0.19 |
| $Fe_2O_3$ | 1.28 | 1.37 | 1.58 | 1.20 | 1.78 | 1.56 | 1.15 | 0.51 | 1.78 |
| $Al_2O_3$ | 11.96 | 17.16 | 12.38 | 15.11 | 26.02 | 26.24 | 12.67 | 24.21 | 21.02 |
| $TiO_2$ | 6.60 | 9.61 | 6.45 | 8.43 | 14.83 | 14.53 | 8.45 | 0.31 | 12.83 |
| $Cr_2O_3$ | | | | | | 6.98 | 3.00 | 9.11 | |
| $MoO_3$ | | | | | | | | | |
| $V_2O_3$ | | | | 1.93 | | | | 0.57 | |
| MnO | 25.72 | 14.52 | 41.94 | 2.83 | 4.98 | 4.65 | 2.77 | 0.07 | 4.98 |
| NiO | | | | | 6.68 | | | 3.61 | 6.68 |
| CaO | 14.98 | 20.47 | 15.33 | 25.23 | 30.73 | 31.02 | 23.66 | 22.10 | 27.73 |
| MgO | 0.22 | 0.31 | 0.21 | 0.27 | 0.48 | 0.51 | 0.25 | 6.41 | 0.48 |
| BaO | 1.06 | 0.86 | 0.97 | 0.55 | 0.96 | 0.98 | 0.55 | | 0.96 |
| $K_2O$ | | | | | | | | | |
| $Na_2O$ | | | | | | | | | |
| $CaF_2$ | 35.93 | 34.54 | 17.39 | 36.06 | 13.35 | 13.35 | 35.04 | 27.27 | 13.35 |
| FeSi | | | | 0.78 | | | 2.50 | 5.50 | |
| CaSi | | | | | | | | | |
| FeMo | | | | | | | 2.50 | | |
| Fe | | | | | | | | | 10.00 |
| $CO_2$ | | | | 5.54 | | | 5.41 | | |

The base substance is sprayed with a solution of soda or silicate of soda ($Na_2O_4SiO_2$) so that their percentage in relation to the total quantity of welding powder amounts to 2–6% dry mass. The moistened base substance is rotated in a mixing drum with the finely powdered enveloper substance until the enveloper substance evenly covers the granules of the base substance. This will have been achieved as soon as no fine particle is any longer loose in the mass. The granulated product thus obtained is dried in a muffle or drum furnace at a temperature of 500–600° C.

*Table V*

[Welding powder combination according to Example 2]

| Base mat. No. | Powder Density | Percent | Adhesive | | Envel. mat. | | Powder Density of Weld. Pow. |
|---|---|---|---|---|---|---|---|
| | | | Kind | Percent Dry Subs. | No. | Percent | |
| 1 | 0.542 | 78.48 | Soda Sil | 5.82 | a | 15.70 | 0.548 |
| 2 | 0.788 | 80.53 | ___do___ | 3.37 | a | 16.10 | 0.790 |
| 3 | 0.798 | 79.54 | Soda sol | 4.55 | b | 15.91 | 0.718 |
| 3 | 0.798 | 57.88 | Soda Sil | 3.53 | c | 38.59 | 0.895 |
| 2 | 0.788 | 77.70 | ___do___ | 4.42 | d | 17.88 | 0.812 |
| 2 | 0.788 | 82.85 | ___do___ | 4.49 | e | 12.66 | 0.834 |
| 2 | 0.788 | 80.00 | ___do___ | 4.12 | b | 15.88 | 0.852 |
| 3 | 0.798 | 75.86 | Soda sol | 4.60 | g | 19.54 | 0.893 |
| 3 | 0.798 | 72.60 | Soda Sil | 3.65 | h | 23.75 | 0.877 |
| 4 | 0.822 | 71.00 | Soda sol | 4.50 | i | 24.50 | 0.902 |

The invention claimed is:

1. Process for producing welding powders with small powder densities (kg./liter) from known basic welding materials which have customary higher powder densities and which consist essentially of the following substances in the following proportions by weight: 30–55% $SiO_2$, 1–15% $Al_2O_3$, up to 15% $TiO_2$, 1–35% CaO, 0.5–25% MgO, up to 10% $CaF_2$, up to 10% MnO, up to 2% $Fe_2O_3$; which comprises compounding said basic welding material in the form of foam-like granules, and then coating said granules with an outer envelope consisting of the foregoing substances in the foregoing proportions.

2. Process according to claim 1, in which said foam-like granules are formed by melting said basic welding materials, then pouring the melt into water to cause same to foam, and then drying the foamed material and comminuting same.

3. Process according to claim 1, in which said foam-like granules are adhesively united with said outer envelope.

4. Process according to claim 3, in which said welding powder, consisting of said foam-like granules adhesively coated with said outer envelope, are heated until slightly softened.

5. Process according to claim 3, in which said foam-like granules are first coated with a thin layer of an adhesive substance, and in which the adhesive-coated granules are then thoroughly mixed with finely-ground envelope material.

6. Process according to claim 5, in which said adhesive substance is selected from the group consisting of soda and silicate of soda.

7. Process according to claim 5, in which the envelope-coated granules are dried at a temperature of 500–600° C.

8. A welding powder consisting of foam-like granules which are coated with an outer envelope, said granules consisting essentially of the following basic welding substances in the following proportions by weight: 30–55% $SiO_2$, 1–15% $Al_2O_3$, up to 15% $TiO_2$, 1–35% CaO, 0.5–25% MgO, up to 10% $CaF_2$, up to 10% MnO, up to 2% $Fe_2O_3$; and said outer envelope consisting of the foregoing substances in the foregoing proportions.

9. A welding powder according to claim 8, in which the outer envelope consists of finely ground particles adhesively united with said foam-like granules.

10. Process according to claim 1, in which said outer envelope contains an oxidizing agent.

11. Process according to claim 1, in which said outer envelope contains a deoxidizing agent.

12. A welding powder according to claim 8, in which said outer envelope contains an oxidizing agent.

13. A welding powder according to claim 8, in which said outer envelope contains a deoxidizing agent.

References Cited by the Examiner

UNITED STATES PATENTS

| 2,443,103 | 6/48 | Gallai-Hatchard | 18—47.2 |
| 2,474,787 | 6/49 | Landis et al. | 148—26 |
| 2,662,840 | 12/53 | Shilling et al. | 148—26 |
| 2,720,473 | 10/55 | Donahey | 148—26 |
| 3,023,133 | 2/62 | Lewis et al. | 148—26 |

FOREIGN PATENTS 524,020  4/56  Canada.

DAVID L. RECK, *Primary Examiner.*

WINSTON A. DOUGLAS, *Examiner.*